Aug. 1, 1950  E. B. ANDERSON  2,517,375
FISHING LINE SINKER
Filed Nov. 9, 1949
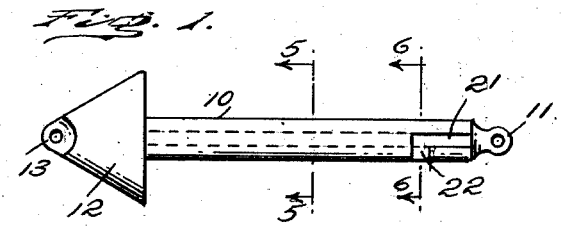
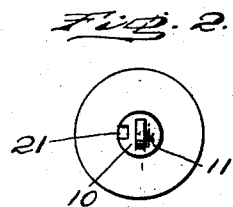
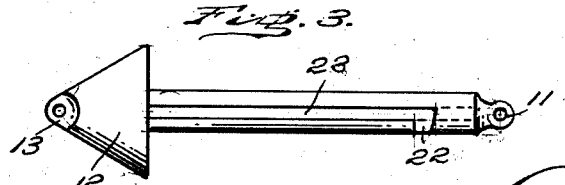
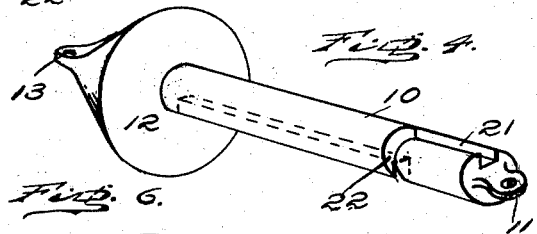
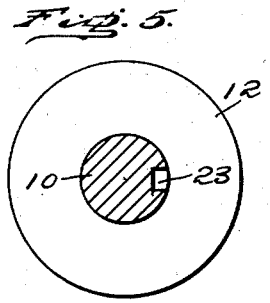
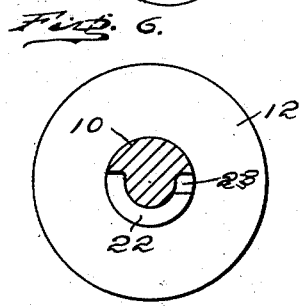
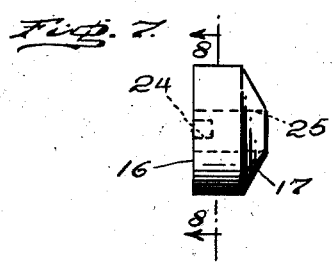
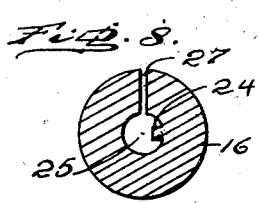
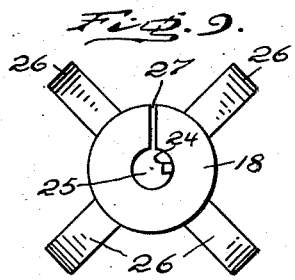
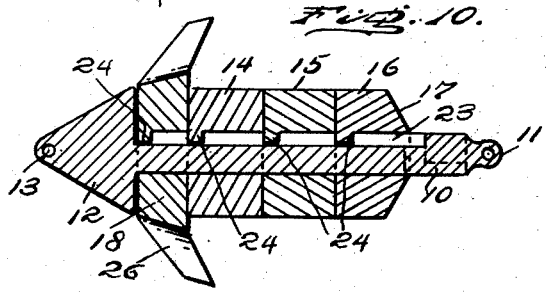
INVENTOR
EDWARD B. ANDERSON
BY
Barr, Borden & Fox
ATTORNEYS.

Patented Aug. 1, 1950

2,517,375

UNITED STATES PATENT OFFICE 2,517,375

FISHING LINE SINKER

Edward B. Anderson, Wilmington, Del.

Application November 9, 1949, Serial No. 126,380

4 Claims. (Cl. 43—43.14)

The present invention relates to fishing accessories and more particularly to a new and novel variable weight sinker as an improvement upon the sinker shown in applicant's pending application Ser. No. 91,331, filed May 4, 1949.

Sinkers of the type to which this invention relates have heretofore been molded into solid shapes of various weights for substitution according to conditions at the time of use. The more general shape is the sinker known as the pyramid sinker in the form of a polygonal cone having an eye at the base for attachment of a fishing line or a leader. Sinkers of this type, unless too heavy for casting, have been found a source of considerable annoyance to fishermen using them in fast running water or strong tidal currents because where, several fishermen in the same boat, cast upstream against the current, the several respective sinkers drift with the currnt so that as the lines pass alongside of the boat they become entangled one with another to the discomfiture of all concerned.

Some of the objects of the present invention are: to provide an improved sinker; to provide a sinker capable of resisting drag when subjected to water currents ordinarily causing a sinker to drift; to provide a sinker having means to anchor it to the sand, mud or other bottom of a body of water, but which anchoring means is readily releasable at the will of the fisherman; to provide a sinker having means for varying the weight of the sinker without detaching it from the line or leader; to provide a novel weight attaching means to a sinker body; to provide a sinker wherein provision is made for using it as a line anchor or to follow the line when trolling or drifting; to provide a sinker which eliminates carrying a lot of separate sinkers of different weights; and to provide other improvements as will hereinafter appear.

In the accompanying drawings Fig. 1 represents a side elevation of a sinker embodying one form of the present invention; Fig. 2 represents an end elevation of the same; Fig. 3 represents an elevation of the side opposite to that shown in Fig. 1; Fig. 4 represents a perspective of the sinker; Fig. 5 represents a section on line 5—5 of Fig. 1; Fig. 6 represents a section on line 6—6 of Fig. 1; Fig. 7 represents a side elevation of one of the attachable weights; Fig. 8 represents a section on line 8—8 of Fig. 7; Fig. 9 represents a front elevation of modified form of weight; and Fig. 10 represents a side elevation of the sinker with a plurality of weights assembled thereon.

Referring to the drawings, one form of the present invention comprises an elongated shank 10, preferably, but not necessarily, of circular cross section, having an eye 11 at one end and a conical weight 12 at the other end terminating in an eye 13. The eyes 11 and 13 serve to attach a fishing line or leader as will be understood. The base of the cone weight 12 is of greater diameter than the shank 10 to provide a circumferential face against which additional annular weights seat when placed on the shank 10 in telescopic relation to increase the weight of the sinker according to either anchored or trolling fishing operations. By providing a plurality of additional annular weights, limited only by the length of the shank 10, the sinker of the invention can answer all fishing conditions and make it unnecessary for the fisherman to burden his tackle box or pockets with a quantity of individual sinkers differing in weight respectively and representing in the aggregate a burdensome load.

Preferably, the additional weights of the invention are designed for properly combining into a single unit; thus, there are one or more cylindrical axially apertured weights 14 and 15; another cylindrical and axially apertured weight 16 with a truncated nose 17; and another 18 axially apertured hub with radially disposed prongs 20. The pronged weight 18 is used for anchoring the sinker against drifting in strong currents and is placed on the shank 10 in abutting relation with the fixed end weight 12. The weight 16 serves as the opposite end of one or more abutting weights 14 and 15 so that its nose is directed forwardly to give a stream-line effect which eliminates turbulence when trolling.

In order to mount the weights on the shank 10 in interlocking relation with the shank, while providing for ready removal and attachment, the shank 10 is provided with a longitudinal groove 21 leading from an end of the shank to a transverse slot 22, which extends part way around the circumference of the shank 10 to terminate in communication with a second longitudinal groove 23 extending to the end weight 12. Each weight is formed with an internal lug 24 radially projecting into the bore 25 of the weight, and having a dimension to fit and slide freely in the respective groove 21, slot 22, and groove 23, while the lug 24 may be anywhere in the length of the bore 25, it is preferable to locate it adjacent to the inner end of the weight. When so located the length of the groove 21 will correspond to the distance the lug is from the outer end of the weight. Thus, a weight placed over the end of the shank 10 with its lug 24 in register with the groove 21 can be moved axially until the lug 24 comes into register with the transverse slot 22, whereupon it is turned to bring the lug 24 into register with the groove 23 when it can then be moved lengthwise of the shank 10 to take its effective position against the weight 12. Thus, as each weight is assembled with the shank 10 it is practically locked against removal, since to do so requires a combined axial and longitudinal movement, which is practically impossible without the required manual manipulation.

The weight 18 is formed with a plurality of prongs 26, preferably four, radiating angularly from the annular hub to have a spaced relation from the shank 10. Preferably the angularity and length of the prongs is the same so that the four biting edges terminate in the same plane and consequently any pair in contact with the bottom of the body of water will simultaneously penetrate the bottom material and so anchor the sinker against drifting in strong currents, tidal or otherwise.

For the purpose of allowing the weights to be placed on or removed from the shank 10 without detaching the fishing line or leader from the eye to which it is connected, each weight is provided with a slot 27 paralleling the axis of the weight and intersecting the bore 25. Thus, each weight can be brought into alinement with the shank by passing the line through the slot 27.

While the chance of a weight working loose from the shank 10 is very remote, such chance is eliminated by inwardly bevelling the outer face of the groove 22 as shown in Fig. 3, and as a consequence any lug of a weight working into the groove 22 will be deflected automatically back to the groove 23 instead of turning into register with the groove 21.

It will now be apparent that a complete unitary sinker has been devised wherein provision is made for meeting all adverse conditions of tides, currents and the like when on the bed of a body of water. Thus, the weight of the sinker can be varied according to requirements so that a single sinker is all that is needed in a tackle box with a minimum of additional weights instead of a large number of separate sinkers each of different weight. Furthermore, while in the foregoing the weights are described as cylindrical, it is to be understood that the invention is not limited to this particular configuration, as obviously the outer contour may be a matter of choice.

Having thus described my invention, I claim:

1. A sinker for fishing lines, comprising a shank having a transverse circumferentially disposed slot, a longitudinal groove extending from one end of said shank to communicate with said slot, and a second longitudinal groove communicating oppositely with said slot but out of register with said first groove, an abutment on said shank, a weight having a bore to receive said shank for positioning said weight against said abutment, and a lug on said weight projecting into said bore and dimensioned to ride in said slot and grooves, whereby said weight is attachable by a manual linear and angular motion transmitted to said weight.

2. A sinker for fishing lines, comprising a shank having a transverse circumferentially disposed slot, a longitudinal groove extending from one end of said shank to communicate with said slot, and a second longitudinal groove communicating oppositely with said slot but out of register with said first groove, an abutment on said shank, a weight having a bore to receive said shank for positioning said weight against said abutment, a lug on said weight projecting into said bore and dimensioned to ride in said slot and grooves, whereby said weight is attachable by a manual linear and angular motion transmitted to said weight, means to attach a fishing line to said shank, and means on said weight for bringing said weight into register with said shank while said line is attached.

3. A sinker for fishing lines, comprising a shank having a transverse circumferentially disposed slot, a longitudinal groove extending from one end of said shank to communicate with said slot, and a second longitudinal groove communicating oppositely with said slot but out of register with said first groove, an abutment on said shank, a weight having a bore to receive said shank for positioning said weight against said abutment, prongs on said weight projecting axially therefrom, and a lug on said weight projecting into said bore and dimensioned to ride in said slot and grooves, whereby said weight is attachable by a manual linear and angular motion transmitted to said weight.

4. A sinker for fishing lines, comprising a shank having a transverse circumferentially disposed slot, a longitudinal groove extending from one end of said shank to communicate with said slot, and a second longitudinal groove communicating oppositely with said slot but out of register with said first groove, an abutment on said shank, a weight having a bore to receive said shank for positioning said weight against said abutment and a radial slot for a fishing line, and a lug on said weight projecting into said bore and dimensioned to ride in said slot and grooves, whereby said weight is attachable by a manual linear and angular motion transmitted to said weight.

EDWARD B. ANDERSON.

REFERENCES CITED

The following references are of record in the file of this patent:

UNITED STATES PATENTS

| Number | Name | Date |
|---|---|---|
| 549,332 | Sewell | Nov. 5, 1895 |
| 1,282,681 | Faribault | Oct. 22, 1918 |
| 2,121,279 | Beck | June 21, 1938 |
| 2,177,007 | Smith | Oct. 24, 1939 |
| 2,230,456 | Henze | Feb. 4, 1941 |
| 2,250,038 | Sink | July 22, 1941 |